United States Patent
Zhang

(10) Patent No.: US 11,403,899 B2
(45) Date of Patent: Aug. 2, 2022

(54) SMART DOOR SYSTEM

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/080,915

(22) Filed: Oct. 27, 2020

(65) Prior Publication Data

US 2021/0043018 A1 Feb. 11, 2021

Related U.S. Application Data

(63) Continuation of application No. PCT/CN2019/084434, filed on Apr. 26, 2019.

(60) Provisional application No. 62/664,070, filed on Apr. 27, 2018.

(51) Int. Cl.
G05B 19/00 (2006.01)
G07C 9/00 (2020.01)
G06V 40/20 (2022.01)
G06V 40/16 (2022.01)

(52) U.S. Cl.
CPC ....... *G07C 9/00563* (2013.01); *G06V 40/171* (2022.01); *G06V 40/25* (2022.01)

(58) Field of Classification Search
CPC ........... G07C 9/00563; G06K 9/00281; G06K 9/00348

USPC ....................................................... 340/5.53
See application file for complete search history.

(56) References Cited

U.S. PATENT DOCUMENTS

| 9,430,888 | B2* | 8/2016 | Herrala | G07C 9/28 |
| 9,633,268 | B1* | 4/2017 | Ma | G06V 40/25 |
| 10,347,063 | B1* | 7/2019 | LaRovere | G07C 9/00571 |
| 10,540,834 | B2* | 1/2020 | Trani | G07C 9/00571 |
| 2012/0299700 | A1* | 11/2012 | Davis | G07C 9/00182 340/5.54 |

(Continued)

FOREIGN PATENT DOCUMENTS

| CN | 204331744 U | 5/2015 |
| CN | 104715531 A | 6/2015 |

(Continued)

OTHER PUBLICATIONS

International Search Report in PCT/CN2019/084434 dated Aug. 26, 2019, 5 pages.

(Continued)

*Primary Examiner* — Zhen Y Wu
(74) *Attorney, Agent, or Firm* — Metis IP LLC

(57) ABSTRACT

A method for smart door operation implemented on a computer may include obtaining image data of one or more subjects. The image data may be acquired by one or more cameras in communication with the computer. The method may also include determining, based on the image data, one or more gait features of at least one of the one or more subjects and determining, at least in part based on the one or more gait features, identity information of the at least one of the one or more subjects. The method may further include sending an unlocking signal to a lock based on the unlocking signal so that the lock is unlocked.

20 Claims, 8 Drawing Sheets

(56) References Cited

U.S. PATENT DOCUMENTS

| | | | |
|---|---|---|---|
| 2015/0245167 A1* | 8/2015 | Bobrow | H04W 8/005 |
| | | | 455/41.2 |
| 2016/0267760 A1* | 9/2016 | Trani | G06V 40/172 |
| 2016/0300410 A1 | 10/2016 | Jones et al. | |
| 2016/0343187 A1* | 11/2016 | Trani | H04W 4/021 |
| 2017/0221289 A1* | 8/2017 | Trani | H04W 4/33 |
| 2017/0256107 A1* | 9/2017 | Trani | G07C 9/28 |
| 2017/0309142 A1* | 10/2017 | Phillips | G08B 7/066 |
| 2019/0057561 A1* | 2/2019 | Zavesky | A61B 5/0205 |
| 2019/0172281 A1* | 6/2019 | Einberg | G07C 9/00571 |
| 2019/0197848 A1* | 6/2019 | Bradley | G08B 29/188 |
| 2019/0295386 A1* | 9/2019 | Roberts | G08B 7/062 |
| 2020/0193141 A1* | 6/2020 | Tan | G06V 20/64 |
| 2020/0193414 A1* | 6/2020 | Sandelov | G07F 7/127 |
| 2020/0273042 A1* | 8/2020 | Wang | G07F 9/009 |
| 2021/0006933 A1* | 1/2021 | Dean | G16Y 40/10 |
| 2021/0216749 A1* | 7/2021 | Trani | G06V 40/172 |
| 2021/0216751 A1* | 7/2021 | Trani | G06K 9/6257 |
| 2021/0216752 A1* | 7/2021 | Trani | G06V 40/165 |

FOREIGN PATENT DOCUMENTS

| | | | |
|---|---|---|---|
| CN | 105608777 A | | 5/2016 |
| CN | 105620614 A | | 6/2016 |
| CN | 205314704 U | | 6/2016 |
| CN | 105787440 A | | 7/2016 |
| CN | 205386784 U | | 7/2016 |
| CN | 105844746 A | | 8/2016 |
| CN | 105966357 A | | 9/2016 |
| CN | 106600783 A | | 4/2017 |
| CN | 106940530 A | | 7/2017 |
| WO | 2016034297 | | 3/2016 |

OTHER PUBLICATIONS

Written Opinion in PCT/CN2019/084434 dated Aug. 26, 2019, 4 pages.

Sebastian Bauer et al., 4D Photogeometric Face Recognition with Time-of-Flight Sensors, 2011 IEEE Workshop on Applications of Computer Vision (WACV), 2011, 8 pages.

First Office Action in Chinese Application No. 201980024075.4 dated Jan. 25, 2022, 24 pages.

The Second Office Action in Chinese Application No. 201980024075.4 dated Apr. 13, 2022, 18 pages.

* cited by examiner

800

```
┌─────────────────────────────────────────┐
│ Obtaining personalized information      │
│ associated with a subject in response   │── 810
│ to a determination that the subject     │
│ corresponds to one of one or more       │
│ allowed entry identities                │
└─────────────────────────────────────────┘
                    │
                    ▼
┌─────────────────────────────────────────┐
│ Sending the personalized information    │── 820
│ associated with the subject to an       │
│ electronic device                       │
└─────────────────────────────────────────┘
```

FIG. 8

SMART DOOR SYSTEM

CROSS-REFERENCE TO RELATED APPLICATIONS

This application is a continuation of International Application No. PCT/CN2019/084434 filed on Apr. 26, 2019, which claims priority of U.S. Provisional Application No. 62/664,070, filed on Apr. 27, 2018, the contents of each of which are hereby incorporated by reference.

TECHNICAL FIELD

The present disclosure generally relates to smart door systems, and more specifically relates to the systems of video surveillance implemented on the doors and the applications provided via the smart door systems.

BACKGROUND

Video surveillance has been widely used in a variety of environments such as, buildings, parking lots, traffic lights, city streets, vehicles, etc. A building video surveillance system relies on multiple cameras installed on the doors, lobbies, hallways, elevators, rooms, and other necessary places of the building. A camera installed on the front door of the building enables the video surveillance system to detect a subject approaching the front door and unlock the front door if the subject is recognized as authorized personnel to enter the building. The current video surveillance system stores a massive amount of user information and at least part of the user information is correlated. Nevertheless, current video surveillance system makes independent detections based on individual subjects and barely provides extra information and/or services to the subject after unlocking the door. Therefore, there is a need to consider the correlation of the user information and provide the subject (e.g., an authorized personnel to enter the building) information and/or services to improve the user experience other than unlocking the door.

SUMMARY

An aspect of the present disclosure provides a method for smart door operation implemented on a computer. The method for smart door operation may include obtaining image data of one or more subjects. The image data may be acquired by one or more cameras in communication with the computer. The method may also include determining, based on the image data, one or more gait features of at least one of the one or more subjects and determining, at least in part based on the one or more gait features, identity information of the at least one of the one or more subjects. The method may further include sending an unlocking signal to a lock based on the unlocking signal so that the lock is unlocked.

In some embodiments, the determining, at least in part based on the one or more gait features, the identity information of the at least one of the one or more subjects the determining, at least in part based on the one or more gait features, the identity information of the at least one of the one or more subjects may include determining, based on the one or more gait features, a first confidence level that the identity information corresponds to one of one or more allowed entry identities; determining, based on one or more facial features of the at least one of the one or more subjects derived from the image data, a second confidence level that the identity information corresponds to the one of the one or more allowed entry identities; and identifying the one of the one or more allowed entry identities as the identity information of the at least one of the one or more subjects in response to at least one of a determination that the first confidence level exceeds or equals a first threshold, or a determination that the second confidence level exceeds or equals a second threshold.

In some embodiments, the determining, based on the one or more gait features, a first confidence level that the identity information is the one of the one or more allowed entry identities may include obtaining a gait recognition model; and determining the first confidence level based on the one or more gait features using the gait recognition model.

In some embodiments, the gait recognition model may be determined via a process including: obtaining video data associated with the one or more allowed entry identities as training samples; extracting gait features from each of the training samples; and training the gait recognition model based on the gait features of each of the training samples.

In some embodiments, the determining, based on one or more facial features of the at least one of the one or more subjects derived from the image data, a second confidence level that the identity information is the one of the one or more allowed entry identities may include: obtaining a face recognition model; and determining the second confidence level based on the facial features of the at least one of the one or more subjects using the face recognition model.

In some embodiments, the face recognition model may be determined via a process including: obtain facial images of the one or more allowed entry identities as training samples; extracting facial features from each of the training samples; and training the face recognition model based on the facial features of each of the training samples.

In some embodiments, the gait features may include at least one of: a leg swinging amplitude, a leg swinging frequency, a leg swinging phase, a waist swinging amplitude, a waist swinging frequency, a waist swinging phase, a joint linear velocity, a joint angular velocity, a step size, a stride frequency, a target velocity, or a target acceleration.

In some embodiments, the facial features may include at least one of: an eye center point, a nose tip, a lip point, a face contour point, an eye contour point, a nose contour point, a lip contour point, or an eyebrow contour point.

In some embodiments, the method may further include showing a message to the at least one of the one or more subjects based on the identity information of the at least one of the one or more subjects.

In some embodiments, the message may include a preset question, and the method may further include: verifying the identity information of the at least one of the one or more subjects based on a response of the at least one of the one or more subjects to the preset question.

In some embodiments, the method may further include obtaining information associated with the one of the at least one of the one or more subjects; determining event information associated with the at least one of the one or more subjects based on current entry and exit information of the at least one of the one or more subjects and the information associated with the at least one of the one or more subjects; and showing the event information to the at least one of the one or more subjects. In some embodiments, the method may further include: obtaining setting information of a device in a building associated with the at least one of the one or more subjects; and operating the device based on the setting information of the device.

In some embodiments, the method may further include: obtaining personalized information associated with the one of the plurality of the allowed entry identities; and showing the personalized information to the at least one of the one or more subjects.

In some embodiments, the method may further include at least one of: sending information associated with the at least one of the one or more subjects to a client terminal based on the identity information; generating a warning signal for the at least one of the one or more subjects based on the identity information; sending the information associated with the at least one of the one or more subjects to a client terminal associated with a specific contact based on the identity information; reporting the police based on the identity information; or recording the information associated with the at least one of the one or more subjects.

According to another aspect of the present disclosure, a system for smart door operation is provided. The system may include an obtaining module configured to obtain image data of one or more subjects, the image data being acquired by one or more cameras in communication with the computer. The system may further include an identification module configured to determine, based on the image data, one or more gait features of at least one of the one or more subjects; and determine, at least in part based on the one or more gait features, identity information of the at least one of the one or more subjects. The system may further include an execution module configured to send an unlocking signal to the door based on the identity information of the at least one of the one or more subjects, so that the lock is unlocked one or more allowed entry identities.

According to another aspect of the present disclosure, a smart door apparatus is provided. The smart door apparatus may include at least one processor and at least one storage storing at least one set of instructions for smart door operation. When executed by the at least one processor, the at least one set of instructions may cause the at least one processor to perform a method. The method may include obtaining image data of one or more subjects. The image data may be acquired by one or more cameras in communication with the computer. The method may also include determining, based on the image data, one or more gait features of at least one of the one or more subjects and determining, at least in part based on the one or more gait features, identity information of the at least one of the one or more subjects. The method may further include sending an unlocking signal to a lock based on the unlocking signal so that the lock is unlocked.

According to another aspect of the present disclosure, a non-transitory computer readable medium may include at least one set of instructions for smart door operation. When executed by at least one processor, the at least one set of instructions may cause the at least one processor to perform a method. The method may include obtaining image data of one or more subjects. The image data may be acquired by one or more cameras in communication with the computer. The method may also include determining, based on the image data, one or more gait features of at least one of the one or more subjects and determining, at least in part based on the one or more gait features, identity information of the at least one of the one or more subjects. The method may further include sending an unlocking signal to a lock based on the unlocking signal so that the lock is unlocked.

According to another aspect of the present disclosure, a system for smart door operation is provided. The system may include a door including a lock, one or more imaging sensors configured to capture image data of an area associated with the door, at least one processor, and at least one storage storing at least one set of instructions for smart door operation. When executed by the at least one processor, the at least one set of instructions may cause the at least one processor to perform a method. The method may include obtaining the image data captured by the one or more imaging sensors. The method may also include determining, based on the image data, pose features of at least one subject presented in the image data and determining, based on the image data, facial features of the at least one subject. The method may further include determining, at least in part based on the pose features and the facial features, identity information of the at least one subject. The method may further include providing, based on the identity information of the at least one subject, a service for the at least one subject.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 8 is an exemplary flow chart illustrating a process for content recommendation according to some embodiments of the present disclosure.

DETAILED DESCRIPTION

Figure 1:
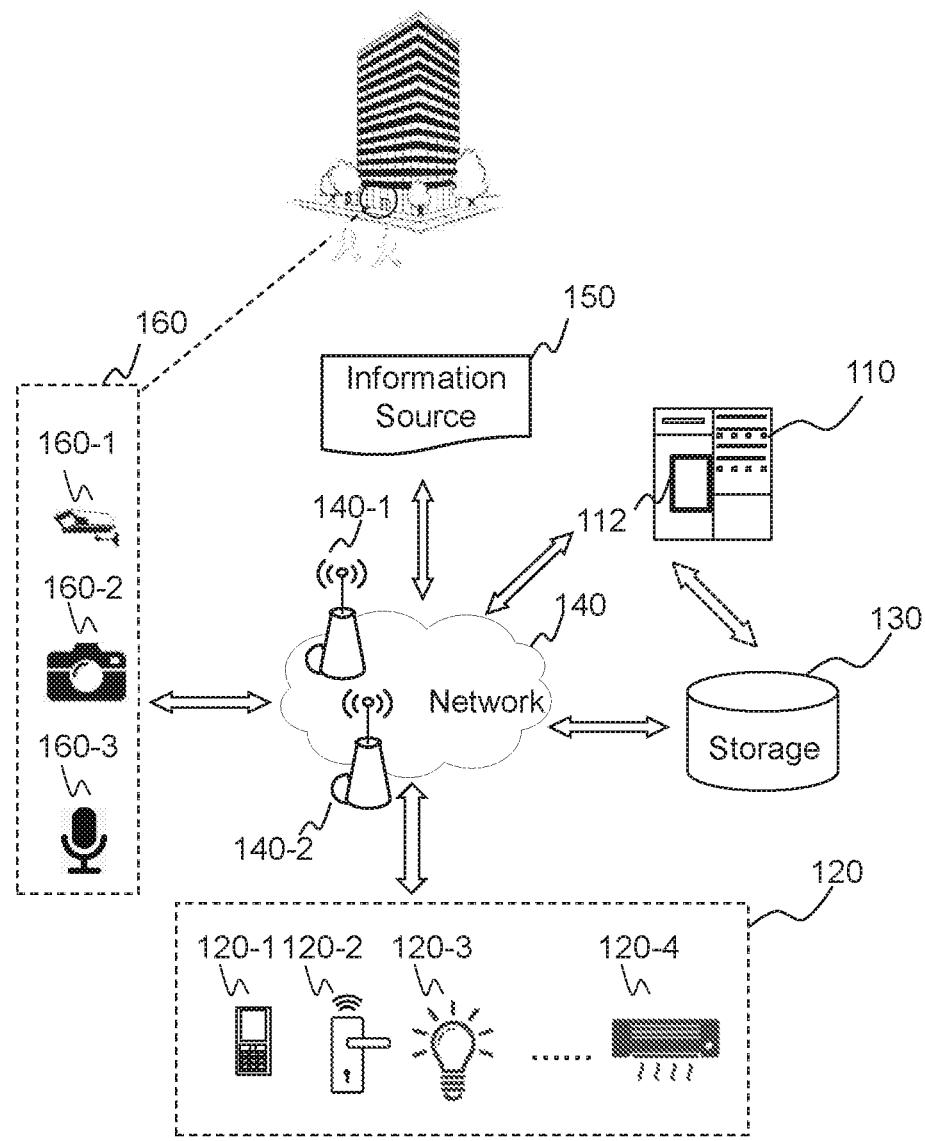
FIG. 1 is a schematic diagram of an application scenario of a smart door system according to the embodiment of the present disclosure.

In order to illustrate the technical solutions related to the embodiments of the present disclosure, brief introduction of the drawings referred to the description of the embodiments is provided below. Obviously, the drawings described below are only some examples or embodiments of the present disclosure. Those having ordinary skills in the art, without further creative efforts, may also apply the present disclosure to other similar scenarios according to these drawings. Unless stated otherwise or obvious from the context, the same reference numeral in the drawings refers to the same structure and operation.

It should be understood that "system," "apparatus," "unit," and/or "module" used herein are a method to distinguish different levels of different components, elements, parts, parts, or assemblies. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements.

According to some embodiments of the present disclosure, flowcharts are used to illustrate the operations performed by the system. It is to be expressly understood, the operations above or below may or may not be implemented in order. Instead, each step may be processed in reverse order or simultaneously. Besides, one or more other operations may be added to the flowcharts, or one or more operations may be omitted from the flowcharts.

FIG. 1 is a schematic diagram of an application scenario of the smart door system 100 according to some embodiments of the present disclosure. For example, the smart door system 100 may be an online service platform for various security services. In some embodiments, the smart door system 100 may be used for information serviced in an identity identification service, such as a gait recognition service for residents in a building, a face recognition service for residents in a building, a voice interaction and/or a voice verification service with a recognized target, an information analysis service and/or relevant information recommendation service, or the like. In some embodiments, the smart door system 100 may also be used for a car rental service, an online to offline transport service, or the like. For example, in the car rental service, the smart door system 100 may be used for the identity authentication for a service provider, a service process monitoring, providing relevant information to users, or the like. The smart door system 100 may include a server 110, a terminal 120, a storage device 130, a network 140, one or more data acquisition terminals 160, and an information source 150.

In some embodiments, the server 110 may be a single server or a server group. The server group may be centralized or distributed (e.g., the server 110 may be a distributed system). In some embodiments, the server 110 may be local or remote. For example, the server 110 may access the information and/or the data of the terminal 120, the storage device 130, and the camera 160 via the network 140. As another example, the server 110 may be directly coupled to the terminal 120 (e.g., a door), the storage device 130, the camera 160 to access the stored information and/or data. In some embodiments, the server 110 may be implemented on a cloud platform. For example, the cloud platform may include a private cloud, a public cloud, a hybrid cloud, a social area cloud, a distributed cloud, a cloud, a multiple cloud, or the like, or any combination thereof. In some embodiments, the server 110 may be implemented on a computing device. In some embodiments, the server 110 may be implemented on a mobile device.

The server 110 may include a processing engine 112. In some embodiments, the processing engine 112 may process data and/or the information related to security services to perform one or more functions as described in the present disclosure. Taking the identity identification service as an example, the processing engine 112 may obtain data including video data, image data, and/or voice data based on the camera 160, process the data, and identify an identity of one of one or more subjects. The processing engine 112 may provide, based on the identity of the subject, a service for the subject. For example, the service may include a home automation service, a content recommending service, a data statistic and analysis service, an assistant service, etc. In some embodiments, the processing engine 112 may obtain user information from the storage device 130. In response to a determination that the identified subject is user A in a building, the user information of the user A may be analyzed and compiled, and event information associated with user A may be generated. The event information may be sent to a client terminal (e.g., a mobile phone) of user A or other users related to user A. In some embodiments, the processing engine 112 may obtain setting information of one or more devices (e.g., electric appliances) in the user's home from the storage device 130. When the identified subject is user A in the building, the processing engine 112 may unlock the door of the building and/or operate the one or more devices (e.g., turn on or turn off an electric appliance) for user A.

In some embodiments, the camera 160 may be a video, an image, and/or a voice acquisition device. In some embodiments, the camera 160 may include, a camera 160-1, a camera 160-2, a microphone 160-3, or the like, or any combination thereof. In some embodiments, the camera 160 may include a mobile terminal, such as a smartphone, a personal digital assistant (PDA), a tablet computer, a handheld game player, smart glasses, a smart watch, a wearable device, or the like, or any combination thereof. In some embodiments, the camera 160 may send the acquired information to one or more devices in the smart door system 100. In some embodiments, the camera 160 may receive an instruction for information acquisition sent by one or more devices in the smart door system 100. In some embodiments, the camera 160 may be installed in a car, a shopping mall, a supermarket, a residence, an office, etc., to obtain information.

In some embodiments, the terminal 120 may include an electric device, such as a mobile device 120-1, a door lock 120-2, an electric light 120-3, an air conditioner 120-4, etc. In some embodiments, the mobile device 120-1 may include a smartphone, a personal digital assistant (Personal Digital Assistance, PDA), a tablet computer, a handheld game player, smart glasses, a smart watch, a wearable device, a virtual reality, a display enhancement device, or the like, or any combination thereof. In some embodiments, the terminal 120 may receive information (e.g., the event information related to user A) sent by one or more components (e.g., the processing engine 112) of the smart door system 100. In some embodiments, the terminal 120 may receive an instruction sent by one or more components (e.g., the processing engine 112) of the smart door system 100, and operate according to the instruction, for example, unlocking, turning on, turning off or the like.

The storage device 130 may store data and/or instructions. In some embodiments, the storage device 130 may store data obtained from the camera 160. In some embodiments, the storage device 130 may store the data and/or the instructions that the server 110 may perform or use to implement exemplary methods described in the present disclosure. In some embodiments, the storage device 130 may include a large-capacity storage device, a removable storage device, a volatile read/write storage device, a read-only memory (ROM), or the like, or any combination thereof. Exemplary large-capacity storage devices may include a magnetic disk, an optical disk, a solid-state drive, or the like. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 140 to be in communication with one or more components (e.g., the server 110, the camera 160, etc.) in the smart door system 100. The one or more components of the smart door system 100 may access the data and/or the instructions stored in the storage device 130 directly or via the network 140. In some embodiments, the storage device 130 may directly connect and/or communicate with one or more components (e.g., the server 110, the terminal 120, and the camera 160, etc.) of the smart door system 100. In some embodiments, the storage device 130 may be a part of the server 110.

The network 140 may facilitate exchange of information and/or the data. In some embodiments, one or more components (e.g., the server 110, the terminal 120, the storage device 130, and the camera 160, etc.) in the smart door system 100 may send the information and/or the data via the network 140 to other components in the smart door system 100. For example, the server 110 may obtain/access data and/or information from the camera 160 over the network 140. In some embodiments, the network 140 may be any type of a wired network or a wireless network, or a combination thereof. For example, the network 140 may include cable networks, wired networks, fiber optic networks, telecommunications networks, intranets, the Internet, local area networks (LANs), wide area networks (WANs), a wireless local area network (WLAN), a metropolitan area network (MAN), a public switched telephone Network (PSTN), a Bluetooth network, a ZigBee network, a near field communication (NFC) network, or the like, or any combination of the examples. In some embodiments, the network 140 may include one or more network access points. For example, the network 140 may include the wired or the wireless network access points such as base stations and/or internet switching points 140-1, 140-2, or the like. Through the access points, one or more components of the smart door system 100 may be connected to the network 140 to exchange data and/or information.

The information source 150 may be a source for providing other information for the smart door system 100. The information source 150 may be used to provide information related to an online service information, for example, weather conditions, legal regulations, news information, life information, life guide information, etc., to the smart door system 100. The information source 150 may be implemented on a single central server, or multiple servers connected via a network, or multiple personal devices, etc. When the information source 150 is implemented on the multiple personal devices, the personal devices may be connected to a cloud server by generating contents (e.g., as referred to as "user-generated contents"), for example, by uploading a text, a voice, an image and/or a video to the cloud server. The information source 150 may include the multiple personal devices and the cloud server.

It should be noted that in some embodiments, the camera 160 may be integrated with a processing engine. The camera 160 may not need to upload data (e.g., videos, images, or voice data) to the server 110, but directly process the obtained data to implement exemplary methods described in the present disclosure.

Figure 2:
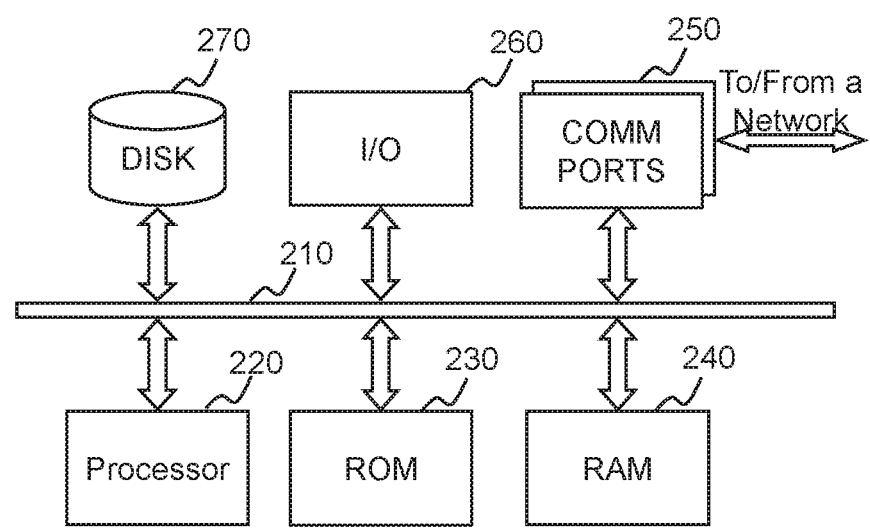
FIG. 2 illustrates a schematic diagram of an exemplary computing device 200 according to some embodiments of the present disclosure.

FIG. 2 illustrates a schematic diagram of an exemplary computing device 200 according to some embodiments of the present disclosure. The computing device 200 may be a computer, such as the server 110 in FIG. 1 and/or a computer with specific functions, configured to implement any particular system according to some embodiments of the present disclosure. The computing device 200 may be configured to implement any component that performs one or more functions disclosed in the present disclosure. For example, the server 110 (e.g., the processing device 112) may be implemented in hardware devices, software programs, firmware, or any combination thereof of a computer like the computing device 200. For brevity, FIG. 2 depicts only one computing device. In some embodiments, the functions of the computing device may be implemented by a group of similar platforms in a distributed mode to disperse the processing load of the system.

The computing device 200 may include a communication terminal 250 that may connect with a network that may implement the data communication. The computing device 200 may also include a processor 220 that is configured to execute instructions and includes one or more processors. The schematic computer platform may include an internal communication bus 210, different types of program storage units and data storage units (e.g., a hard disk 270, a read-only memory (ROM) 230, a random-access memory (RAM) 240), various data files applicable to computer processing and/or communication, and some program instructions executed possibly by the processor 220. The computing device 200 may also include an I/O device 260 that may support the input and output of data flows between the computing device 200 and other components. Moreover, the computing device 200 may receive programs and data via the communication network.

Figure 3A:
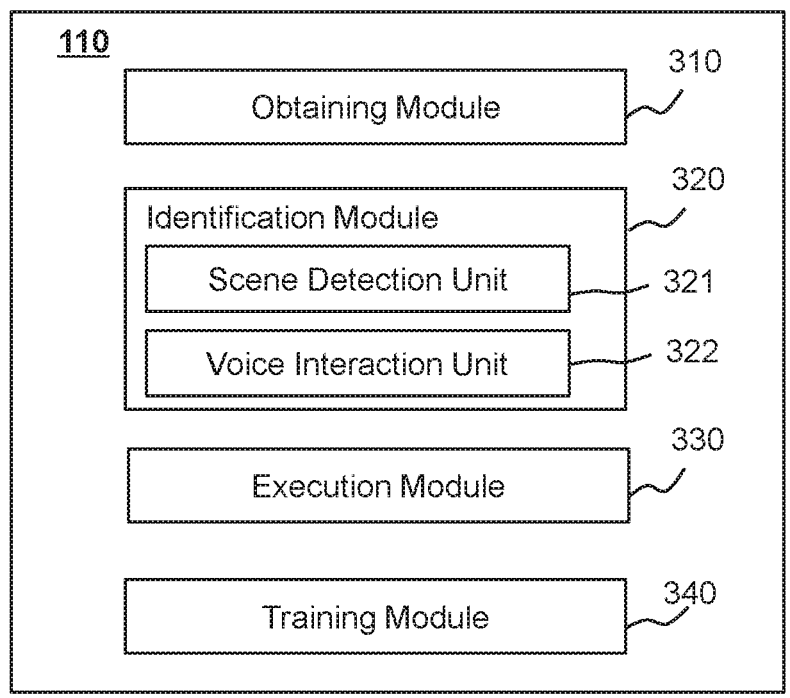
FIG. 3A is a block diagram illustrating the processing engine 112 according to some embodiments of the present disclosure.

FIG. 3A is a block diagram illustrating the processing engine 112 according to some embodiments of the present disclosure. As shown in FIG. 3A, the processing engine 112 may include an obtaining module 310, an identification module 320, an execution module 330, and a training module 340.

The obtaining module 310 may be configured to data for identity recognition. For example, the obtaining module 310 may obtain image data acquired by a camera. The camera (e.g., the camera 160) may include one or more Internet Protocol cameras (also refer to as IP camera) for building surveillance purposes. The IP camera may be a type of digital video camera commonly employed for surveillance. As another example, the obtaining module 310 may obtain one or more gait features of at least one of one or more subjects presented in the image data, one or more facial images of the one or more subjects from the image data, etc. As still another example, the obtaining module 310 may obtain voice data of the at least one of the one or more subjects acquired by an audio device (e.g., a microphone). In some embodiments, the obtaining module 310 may obtain one or more models for identity recognition, such as a gait recognition model, a facial recognition, a voice recognition model, etc. In some embodiments, the obtaining module 310 may access and/or communicate with one or more content providers via the network to obtain the information, for example, a GPS based navigation provider, a weather forecasting provider, a personal styling provider, a dinning content provider, etc. In some embodiments, the obtaining module 310 may access and/or communicate with one or more terminals (e.g., the terminal 120), one or more storage device (e.g., the storage 130), one or more information source (e.g., the information source 150) for obtaining the data for identity recognition.

The identification module 320 may be configured to determine identity information of at least one of the one or more subjects presented in the image data. In some embodiments, the identity information may include whether the at least one of the one or more subjects corresponds to one of one or more allowed entry identities of a door of a place, such as a building, a company, a housing estate, a house, etc. For example, the identity information may be that the at least one of the one or more subjects corresponds to one of the one or more allowed entry identities. As another example, the identity information may be that the at least one of the one or more subjects is not one of the one or more allowed entry identities. In some embodiments, the identity information may correspond to a specific allowed entry identity among the one or more allowed entry identities or an identity (e.g., a friend, a visitor, a partner, etc.) of one the one or more allowed entry identities. An allowed entry identity may represent a resident of the building, a relative of a resident of the building, a staff of the building, a pet of a resident of the building, etc. For example, when a building is a residential building, an allowed entry identity is the resident of the residential building. If the building is an office space, the allowed entry identity may be a staff in the office. In some embodiments, the one or more allowed entry identities may be stored in a database. In some embodiments, the database may store gait data (e.g., gait features), facial data (e.g., facial features), voice data (e.g., acoustic features), preset voice quiz data of each of the one or more allowed entry identities. The smart door system 100 may update the database in real time or periodically.

The execution module 330 may be configured to provide a service to the at least one of the one or more subjects in response to the determination that the at least one of the one or more subjects corresponds to one of the one or more allowed entry identities. For example, the execution module 330 may provide recommending contents (e.g., personalized information) to an electric device (e.g., a mobile phone) of the at least one of the one or more subjects. As another example, the execution module 330 may direct a smart home system of the at least one of the one or more subjects to operate in response to the determination that the at least one of the one or more subjects corresponds to one of the one or more allowed entry identities. As a still another example, the execution module 330 may assist the at least one of the one or more subjects to for example, get information of family members, arrange personal schedule, etc. The execution module 330 may generate an unlocking signal and/or send the unlocking signal to a corresponding door lock the identity information of the one or more subjects is an allowed entry identity. The execution module 330 may direct and/or operate the door lock to unlock. More descriptions for providing a service to the at least one of the one or more subjects may be found elsewhere in the present disclosure (e.g., FIGS. 6-8 and the descriptions thereof).

In some embodiments, the training module 340 may be used to generate one or more models for identity recognition, such as a gait recognition model, a facial recognition, a voice recognition model, etc. For example, the training module 340 may obtain a plurality of training samples associated with a plurality of allowed entry identities. The training module 340 may train a preliminary model for identity recognition using the plurality of training samples. Each of the training samples may correspond to one of the one or more allowed entry identities. Each of the one or more allowed entry identities may correspond to a plurality of videos, images, and/or voices. A training sample may include at least one video, image, and/or voice of an allowed entry identity. The plurality of videos, images, and/or voices of an allowed entry identity may include be generated at different time and/or periods (e.g., childhood, youth, senectitude, etc.), different conditions (e.g., in case of injury, under load, etc.), different angles and/or views. For example, the plurality of videos of an allowed entry identity may include a walking video of a resident in a normal state, a walking video of a resident when the resident is carrying a bag, walking videos of a resident from the back, or the front, a side of the resident, etc. In some embodiments, the preliminary model may be constructed based on a neural network model. Exemplary neural network models may include a convolutional neural network (CNN), a deep convolutional neural network (DCNN), a recurrent neural network (RNN), a back propagation (BP) neural network, a radial basis function (RBF) neural network, a perceptron neural network, a linear neural network, a self-organizing neural network, a feedback neural network, or the like, or a combination thereof.

It should be understood that the system and its modules shown in FIG. 3 may be implemented in various ways. For example, in some embodiments, the system and its modules may be implemented by hardware, software, or a combination of software and hardware. The hardware may be implemented by a dedicated logic; the software may be stored in a memory and may be implemented by an appropriate instruction executing system (e.g., a microprocessor, a dedicated design hardware, or the like). It will be appreciated by those skilled in the art that the above method and system may be implemented by computer-executable instructions and/or embedding in control codes of a processor. For example, the control codes may be provided by a medium such as a disk, a CD or a DVD-ROM, a programmable memory device such as read-only memory (e.g., firmware), or a data carrier such as an optical or electric signal carrier. The system and the module in the present disclosure may be implemented not only by a hardware circuit in a programmable hardware device in a ultra large scale integrated circuit, a gate array chip, a semiconductor such as a logic chip or a transistor, a field programmable gate array, or a programmable logic device, but also by a software performed by various processors, and further also by a combination of the hardware and the software above (e.g., firmware).

It is to be noted that the above description of the candidate display, the determination of the system and its modules is merely for convenience of description and does not limit the present disclosure to the scope of the embodiments. For persons having ordinary skills in the art, the modules may be combined in various ways or connected with other modules as sub-systems, and various modifications and transformations in form and detail may be conducted under the teaching of the present disclosure. For example, the obtaining module 310, the identification module 320, the executing module 330, and the training module 340 disclosed in FIG. 3 may be different modules in the same system or may be a function of two or more modules in one module. For example, the identification module 320 and the execution module 330 may be two modules, or one module may have both an identification and an execution function. As still another example, each module may share a single storage module. Each module may also have its respective storage module. All such modifications are within the protection scope of the present disclosure.

Figure 3B:
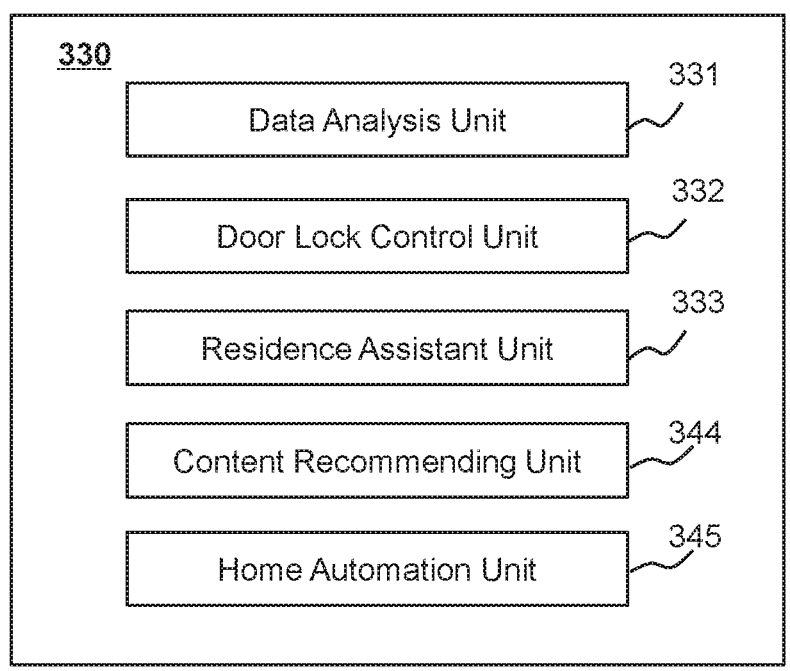
FIG. 3B is a block diagram illustrating the execution module 330 according to some embodiments of the present disclosure.

FIG. 3B is a block diagram illustrating the execution module 330 according to some embodiments of the present disclosure. As shown in FIG. 3B, the execution module 330 may include a data analysis unit 331, a door lock control unit 332, a residence assistant unit 333, a content recommending unit 334, and a home automation unit 335.

The data analysis module 331 may be configured to obtain information associated with one or more allowed entry identities (e.g., residents of a housing estate or staff of a building) from a storage device (e.g., a resident database) and compile the information to be used by other modules. The compiled information may include data collected from one or more cameras (e.g., IP cameras) placed in the building or the housing estate, for example, front doors, back doors. The compiled information may include time, entrance (i.e., front door, back door, or garage door), resident's family member's arrival information, etc. The compiled information may indicate various correlations among data collected at different times, data collected from different cameras, data related to different residents or subjects, etc.

The door lock control unit 332 may be configured to direct a lock of a door to be locked or unlocked based on recognition result of the identification module 320. For example, if the identification module 320 determines that a subject corresponds to one of one or more allowed entry identities. The door lock control unit 332 may generate an unlock signal and send the unlocking signal to the lock of the door. The lock of the door may be unlocked based on the unlock signal.

The residence assistant unit 333 may be configured to determine event information associated with the resident based on the compiled information and the communication with an electronic device of an allowed entry identity (e.g., a resident). For example, when resident A enters the building at 3 pm on Jun. 1, 2017, based on the compiled information, the resident assistant module may determine that the resident A's daughter has a dance performance at the school at 4 pm and resident A's wife has entered the building prior to resident A. Therefore, the resident assistant module may transmit a message to resident A's electronic device alerting that they need to attend their daughter's dance performance and his wife is home already.

The content recommending unit 334 may be configured to recommend content (e.g., personalized information of an allowed entry identity) or the event information to be displayed on the electric device (e.g., a mobile phone) of an allowed entry identity (e.g., a resident). The content may include traffic information to the daughter's school, weather information, dress code advice, dinning or drive-through restaurant information near the event location, etc. The content recommending module 334 may communicate with one or more content providers via the network to obtain the information, for example, a GPS based navigation provider, a weather forecasting provider, a personal styling provider, a dinning content provider, etc.

The home automation unit 335 may be configured to automatically turn on or off the home facilities upon detecting a resident's entering the building by communicating with one or more smart sensors installed in the resident's home. For example, the home automation module may turn on the air conditioner of the resident's home upon detecting that the resident enters the building in hot summer. As another example, the home automation module may turn on the lights in the doorway of the resident's home upon detecting that the resident returns in evening.

Figure 4:
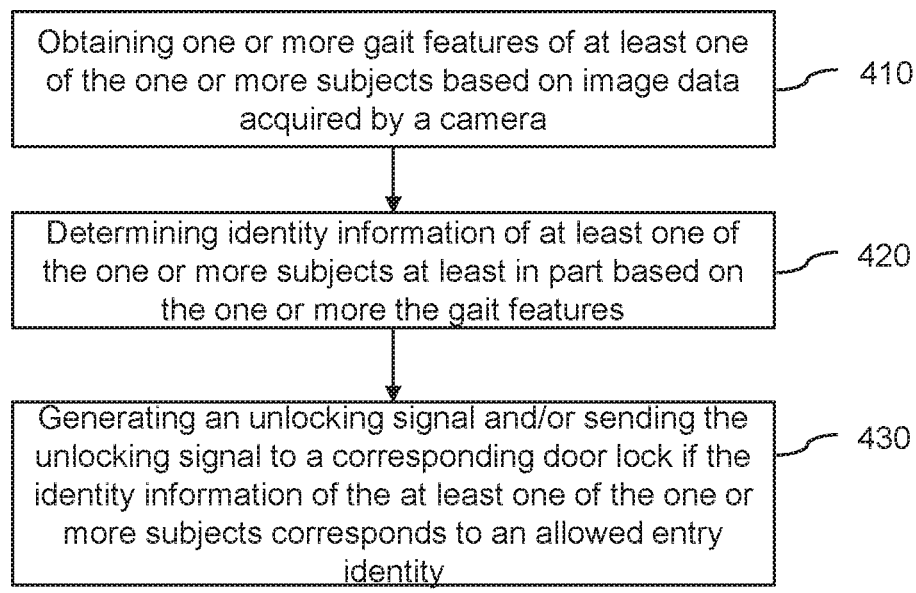
FIG. 4 is an exemplary flow diagram illustrating a process for smart door operation according to some embodiments of the present disclosure.

FIG. 4 is an exemplary flow diagram illustrating a process 400 for smart door operation according to some embodiments of the present disclosure. In some embodiments, process 400 may be performed by a processing logic, which may include hardware (e.g., a circuit, a dedicated logic, a programmable logic, microcode, or the like), software (instructions implemented on a processing device to perform hardware emulation), or the like, or any combination thereof. One or more operations in the process 400 for controlling doors shown in FIG. 4 may be implemented by the smart door system 100 shown in FIG. 1. For example, the process 400 may be stored in the storage device 130 in the form of instructions and called and/or executed by the processing engine 112.

In 410, the processing engine 112 may obtain one or more gait features of at least one of the one or more subjects based on image data acquired by a camera. Operation 410 may be performed by the obtaining module 310. The camera (e.g., the camera 160) may include one or more Internet Protocol cameras (also refer to as IP camera) for building surveillance purposes. The IP camera may be a type of digital video camera commonly employed for surveillance. Unlike analog closed-circuit television (CCTV) cameras, the IP camera may send and receive data via a network (e.g., the network 140). In some embodiments, the obtaining module 310 may obtain the image data (e.g., a video, an image) of at least one of the one or more subjects from the camera, the storage device 130, the terminal 120, or any other storage as described elsewhere in the present disclosure. The processing engine 112 (e.g., the obtaining module 310) may extract gait features from the image data. For example, the processing engine 112 may analyze the image data to determine the gait period of at least one of the one or more subjects. The processing engine 112 (e.g., the obtaining module 310) may further determine a start frame and an end frame during the gait period. The processing engine 112 (e.g., the obtaining module 310) may determine an image sequence in the gait period from the image data. And then the processing engine 112 (e.g., the obtaining module 310) may determine the gait features from one or more image sequences. In some embodiments, the image sequence may include two-dimensional images of the motion contour of at least one of the one or more subjects extracted from the image data (e.g., a video). In some embodiments, the image sequence may be a normalized motion image sequence.

In some embodiments, the gait features may include motion trajectory data of main joints of at least one of the one or more subjects, such as a motion trajectory of the joint angle of a leg, a motion trajectory of the waist, and a motion trajectory of a foot. For example, the gait features may include a swinging amplitude of a leg, a swinging frequency of a leg, a swinging phase of a leg, a swinging amplitude of the waist, a swinging frequency of the waist, a swinging phase of the waist, a linear velocity of a joint, an angular velocity of a joint, a stride size, a stride frequency, a target velocity, a target acceleration, or the like, or any combination thereof. In some embodiments, the gait features may include the length of a leg bone, the length of the spine, the motion center of gravity, or the like. The leg may include a thigh and/or a calve. The joint may include a knee joint. In some embodiments, the gait features may also include motion trajectory data of the upper body. For example, the gait features may include the swinging amplitude of an arm, the swinging frequency of the arm, the swinging phase of the arm, the linear velocity of an elbow joint, the angular velocity of the elbow joint, the twisting amplitude of the upper body, the posture habit of the upper body (e.g., the posture habit of carrying a bag in left hand and swinging right hand), etc. In some embodiments, the one or more subjects may be a biological target of a person or a pet, or the like.

In some embodiments, the face recognition may also be performed by the processing engine 112 when identifying at least one of the one or more subjects. For example, when the camera captures the image data (e.g., an image) of the one or more subjects, the obtaining module 310 may obtain one or more facial images of the one or more subjects from the image data. The processing engine 112 may further perform face recognition to further determine the identity of at least one of the one or more subjects. The obtaining module 310 and/or the camera may determine feature points of the face of at least one of the one or more subjects from the one or more facial images. As used herein, a feature point of the face may refer to a point and/or region of the face that is not easily affected by facial expressions. For example, a feature point of the face may include the eye center point, the nose tip, the lip corner, etc. The obtaining module 310 may determine one or more facial features based on the feature points of the face. In some embodiments, the facial features may include features (e.g., a position) of the eye center point, the nose tip, the lip point, the face contour point, the nose contour point, the lip contour point, the eyebrow contour point, or the like, or any combination thereof. In some embodiments, the processing engine 112 may perform an affine transformation on the one or more facial images based on the feature points to obtain normalized facial images. The normalized facial images may be a frontal facial image with a standard size.

In some embodiments, the obtaining module 310 may obtain voice data of the one or more subjects from the terminal 120 (e.g., a microphone or an audio device). The processing engine 112 may determine the identity of at least one of the one or more subjects by voice recognition. For example, the processing engine 112 may determine acoustic features of the at least one of the one or more subjects from the voice data. The processing engine 112 may recognize the at least one of the one or more subjects based on the acoustic features of the at least one of the one or more subjects. In some embodiments, the obtaining module 310 may also perform voice interaction with the one or more subjects via the microphone or the audio device. The processing engine 112 may identify or verify the identity of at least one of the one or more subjects based on voice response information of the at least one of the one or more subjects. In some embodiments, the obtaining module 310 may obtain the gait features, the facial features, and/or the voice data from the storage device 130 and/or the terminal 120 via the network 140. The obtaining module 310 may send the obtained data to the server 110 for processing.

In 420, the processing engine 112 may determine identity information of at least one of the one or more subjects at least in part based on the one or more gait features. In some embodiments, operation 420 may be performed by the identification module 320. In some embodiments, the identity information may include whether the at least one of the one or more subjects corresponds to one of one or more allowed entry identities of a door of a place, such as a building, a company, a housing estate, a house, etc. For example, the identity information may be that the at least one of the one or more subjects corresponds to (or is consistent with) one of the one or more allowed entry identities. As another example, the identity information may be that the at least one of the one or more subjects does not correspond to (or is inconsistent with) one of the one or more allowed entry identities. In some embodiments, the identity information may correspond to (or is consistent with) a specific allowed entry identity among the one or more allowed entry identities or an identity (e.g., a friend, a visitor, a partner, etc.) of one the one or more allowed entry identities. An allowed entry identity may represent a resident of the building, a relative of a resident of the building, a staff of the building, a pet of a resident of the building, etc. For example, when a building is a residential building, an allowed entry identity is the resident of the residential building. If the building is an office space, the allowed entry identity may be a staff in the office. In some embodiments, the one or more allowed entry identities may be stored in a database. In some embodiments, the database may store gait data (e.g., gait features), facial data (e.g., facial features), voice data (e.g., acoustic features), preset voice quiz data of each of the one or more allowed entry identities. The smart door system 100 may update the database in real time or periodically.

The identification module 320 may determine the identity information based on a first confidence level indicating that the at least one of the one or more subjects corresponds to one of the one or more allowed entry identities. As used herein, a confidence level may denote a probability that the at least one of the one or more subjects corresponds to (or is consistent with) one of the one or more allowed entry identities. The greater the confidence level is, the greater the probability that the at least one of the one or more subjects corresponds (or is consistent with) to one of the one or more allowed entry identities. In some embodiments, the identification module 320 may determine the first confidence level based on the gait features. For example, the identification module 320 may match the gait features of the at least one of the one or more subjects determined in 410 with the gait data of each of at least a portion of the one or more allowed entry identities in the database (e.g., a resident database). Further, the identification module 320 may determine a similarity degree between the gait features of the at least one of the one or more subjects determined in 410 and the gait data of each of at least a portion of the one or more allowed entry identities. The similarity degree may denote a probability that the at least one of the one or more subjects matches one of at least a portion of the one or more allowed entry identities. The greater the similarity degree is, the greater the probability that the at least one of the one or more subjects matches with one of at least a portion of the one or more allowed entry identities may be. The identification module 320 may determine one of the one or more allowed entry identities that has a greatest similarity degree with the at least one of the one or more subjects. In some embodiments, the identification module 320 may determine the one of the one or more allowed entry identities that has a greatest similarity degree with the at least one of the one or more subjects corresponding to the identity information of the at least one of the one or more subject. In some embodiments, the identification module 320 may determine the first confidence level based on the greatest similarity degree. For example, the identification module 320 may designate the greatest similarity degree as the first confidence level. In some embodiments, the identification module 320 may identify one of the one or more allowed entry identities that is closest to or matches with the at least one of the one or more subjects and/or determine the first confidence level by a numerical operation, function establishment, machine learning model training, etc. For example, a gait recognition model may be trained to determine whether the at least one of the one or more subjects corresponds to one of the one or more allowed entry identities, determine a specific allowed entry identity from the one or more allowed entry identities that is closest to and/or matches with the at least one of the one or more subjects, and/or determine the first confidence level.

In some embodiments, the identification module 320 may determine the identity information based on a second confidence level indicating that the at least one of the one or more subjects corresponds to one of the one or more allowed entry identities. In some embodiments, the identification module 320 may determine the second confidence level based on the facial features determined in 410 features. For example, the identification module 320 may match the facial features of the at least one of the one or more subjects determined in 410 with the facial data of one of at least a portion of the one or more allowed entry identities in the database (e.g., a resident database). Further, the identification module 320 may determine a similarity degree between the facial features of the at least one of the one or more subjects determined in 410 and the facial data of one of at least a portion of the one or more allowed entry identities. The identification module 320 may determine one of the one or more allowed entry identities that has a greatest similarity degree with the at least one of the one or more subjects. In some embodiments, the identification module 320 may determine that the one of the one or more allowed entry identities that has a greatest similarity degree with the at least one of the one or more subjects corresponds to (or is consistent with) the identity information of the at least one of the one or more subject. In some embodiments, the identification module 320 may determine the second confidence level based on the greatest similarity degree. For example, the identification module 320 may designate the greatest similarity degree as the second confidence level. In some embodiments, the identification module 320 may identify one of the one or more allowed entry identities that is closest to or matches with the at least one of the one or more subjects and/or determine the second confidence level by a numerical operation, function establishment, machine learning model training, etc. For example, a facial recognition model may be trained to determine whether the at least one of the one or more subjects corresponds to one of the one or more allowed entry identities, determine a specific allowed entry identity from the one or more allowed entry identities that is closest to and/or matches with the at least one of the one or more subjects, and/or determine the second confidence level.

In some embodiments, the first confidence level and the second confidence level may be same or different. In some embodiments, the recognition result based on the gait features (i.e., gait recognition result) and the recognition result based on the facial features (i.e., facial recognition result) may be same or different. For example, the gait recognition result may be that the at least one of the one or more subjects corresponds to one of the one or more allowed entry identities, while the facial recognition result may be that the at least one of the one or more subjects corresponds to (or is consistent with) one of the one or more allowed entry identities. As another example, the gait recognition result may be that the at least one of the one or more subjects corresponds to (or is consistent with) allowed entry identity A, while, the facial recognition result may be that the at least one of the one or more subjects corresponds to (or is consistent with) allowed entry identity B.

In some embodiments, the identification module 320 may determine that the at least one of the one or more subjects corresponds to one of the one or more allowed entry identities if the first confidence level exceeds or equals a first threshold. The first threshold may be a preset confidence level threshold. The first threshold may be an empirical value determined by an empirical person or a reasonable value obtained by statistical calculation. The first threshold may be initially set by the smart door system 100 but adjustable depending on various factors. For example, resident A broke his left leg due to a car accident one month ago and he/she has been observed walking in a crutch. Therefore, the threshold with respect to resident A may be adjusted based on the gait changes. Alternatively, the system may set the confidence threshold as following a random distribution to improve the accuracy of subject detection. If the first confidence level exceeds or equals the first threshold, the gait features of the at least one of the one or more subjects may be highly similar to or consistent to the gait data of the one of the one or more allowed entry identities, and the at least one of the one or more subjects may be identified as the one of the one or more allowed entry identities. If the first confidence level is less than the first threshold, the gait features of the at least one of the one or more subjects may be not highly similar to the gait data of all the one or more allowed entry identities, and the at least one of the one or more subjects may not be identified as an allowed entry identity.

In some embodiments, the identification module 320 may determine that the at least one of the one or more subjects corresponds to one of the one or more allowed entry identities if the second confidence level exceeds or equals a second threshold. The second threshold may be a pre-set confidence level threshold. The second threshold may be an empirical value determined by an empirical person or a reasonable value obtained by statistical calculation. The second threshold may be initially set by the smart door system 100 but adjustable depending on various factors. For example, resident A wears a mask due to bad environment or illness. Therefore, the second threshold with respect to resident A may be adjusted based on the screened face. Alternatively, the system may set the confidence threshold as following a random distribution to improve the accuracy of subject detection. If the second confidence level exceeds or equals the second threshold, the facial features of the at least one of the one or more subjects may be highly similar to or consistent with the facial data of the one of the one or more allowed entry identities, and the at least one of the one or more subjects may be considered as an allowed entry identity.

In some embodiments, the identification module 320 may determine that the one or more subjects corresponds to (or is consistent with) one of the one or more allowed entry identities if the first confidence level exceeds or equals the first threshold and the second confidence level exceeds or equals the second threshold. For example, the identification module 320 may perform gait identification and perform facial recognition simultaneously. The at least one of the one or more subjects may be determined to correspond to (or consistent with) one of the one or more allowed entry identities if the first confidence level exceeds or equals the first threshold and the second confidence level exceeds or equals the second threshold. The at least one of the one or more subjects may not correspond to (or is inconsistent with) an allowed entry identity if the first confidence level is less than the first threshold and/or the second confidence level is less than the second threshold.

In some embodiments, the identification module 320 may update the gait data or the facial data of the one or more plurality of allowed entry entities according to the recognition result. In some embodiments, if the recognition result is that the first confidence level is less than the first threshold, but when the second recognition level exceeds or equals the second threshold, the gait data of the one of the one or more allowed entry identities that matches the at least one of the one or more subjects in the database (e.g., a resident database) may be updated according to the gait features of the at least one of the one or more subjects. For example, a resident suddenly has an accident and needs to walk on crutches for a period of time, resulting in a gait recognition result that the resident cannot be entered the building, but the face recognition result that the resident is allowed to enter the building. The gait data of the resident stored in the database may be updated. In some embodiments, if the second confidence level is less than the second threshold (e.g., as the resident makes up), however, the first confidence level exceeds or equals the first threshold, the facial data of the resident stored in the database may be updated according to the facial features of the resident.

In some embodiments, the identification module 320 may perform verification of recognition result (e.g., the gait recognition result and/or the facial recognition result) based on the voice data obtained in 410. In some embodiments, the identification module 320 may send a voice message to the at least one of one or more subjects based on the recognition result (e.g., the gait recognition result and/or the facial recognition result). For example, if the at least one of the one or more subjects is an allowed entry identity, the identification module 320 may send a greeting voice information: "Hello, please come in." If the at least one of the one or more subjects is not an allowed entry identity, the identification module 320 may send a warning message through an audio device (e.g., a speaker, etc.), such as "Non-resident, what can I do for you?". In some embodiments, the voice message and/or the warning message may include a preset question. The identification module 320 may verify the identity of the at least one of the one or more subjects based on a response to the preset question of the one or more subjects. For example, if the first confidence level is not high, the identification module 320 may query the one or more subjects for a preset question. If a response of the one or more subjects for the preset question is the preset answer, the value of the first confidence level may be increased exceeding the first threshold. The one or more subjects may be determined as one of the one or more allowed entry identities.

In some embodiments, the identification module 320 may identify another subject of the one or more subjects in the image data as described elsewhere in the present disclosure. If the identification module 320 determines that another subject is not an allowed entry identity of the building, the identification module 320 may determine a behavior of the another subject. For example, the identification module 320 may determine whether another subject is talking with the at least one of the one or more subjects. If the another subject is talking with the at least one of the one or more subjects (i.e., an allowed entry identity), the identification module 320 may determine that the another subject is a friend or acquaintance of the allowed entry identity. If the another subject is not talking with the at least one of the one or more subjects (i.e., an allowed entry identity), the identification module 320 may determine whether the another subject is involved an abnormal behavior, such as tailing after the allowed entry identity In 430, the processing engine 112 may generate an unlocking signal and/or send the unlocking signal to a corresponding door lock if the processing engine 112 determines that the identity information of the one or more subjects is an allowed entry identity. The processing engine 112 may direct and/or operate the door lock to unlock. In some embodiments, operation 430 may be performed by the execution module 330. In some embodiments, the corresponding door lock may be a door lock on the building where the at least one of the one or more subjects is allowed to enter. For example, if the building is a residential building, the allowed entry identities may be the residents of the residential building, and the door lock may be installed on the access door of the residential building. If the at least one of the one or more subjects is identified as a resident of the residential building, the execution module 330 may unlock the door lock of the residential building. As another example, if the building is a residential building including a plurality of dwellings, the allowed entry identities are the residents in the residential building, and the door lock may be installed on the enter gate of the residential building. If the at least one of the one or more subjects is identified as a resident of the resident building, the execution module 330 may unlock the enter gate and allow the at least one of the one or more subjects to enter the residential building. For each dwelling in the residential building, the corresponding door lock is the door lock on the dwelling. The allowed entry identities of each dwelling may be residents of each dwelling. In some embodiments, if the processing engine 112 determines that the at least one of the one or more subjects is not an allowed enter identity, the execution module 330 may perform a predetermined operation. The predetermined operation may include sending the information of the at least one of the one or more subjects to at least one of the allowed entry identities, sending a warning message to the at least one of the one or more subjects, sending the information of the at least one of the one or more subjects to a designated contact, reporting police, recording the information of the at least one of the one or more subjects, or the like, or any combination thereof. In some embodiments, the execution module 330 may perform different predetermined operations according to the identity information of the at least one of the one or more subjects. For example, if the at least one of the one or more subjects is not an allowed entry identity, but it is a recorded identity in a database, the execution module 330 may send the visiting time or video record of the at least one of the one or more subjects to the mobile phone of a resident, and send a voice message request to the at least one of the one or more subjects, such as "The host is not at home now, you can leave a message." As another example, if the at least one of the one or more subjects is a recorded visitor in the database with bad record, the execution module 330 may send the video record of the at least one of the one or more subjects to the mobile phone of a resident and send a prompt information to a security of the building: "There are bad visitors appearing, please pay attention".

In some embodiments, the processing engine 112 (e.g., the execution module 330) may provide a service to the at least one of the one or more subjects in response to the determination that the at least one of the one or more subjects corresponds to one of the one or more allowed entry identities. For example, the processing engine 112 (e.g., the execution module 330) may provide recommending contents (e.g., personalized information) to an electric device (e.g., a mobile phone) of the at least one of the one or more subjects. As another example, the processing engine 112 (e.g., the execution module 330) may direct a smart home system of the at least one of the one or more subjects to operate in response to the determination that the at least one of the one or more subjects corresponds to one of the one or more allowed entry identities. As a still another example, the processing engine 112 (e.g., the execution module 330) may assist the at least one of the one or more subjects to for example, get information of family members, arrange personal schedule, etc. More descriptions for providing a service to the at least one of the one or more subjects may be found elsewhere in the present disclosure (e.g., FIGS. 6-8 and the descriptions thereof).

It should be noted that the description of the process 400 is for illustrative purposes only and does not limit the scope of application of the present disclosure. Various modifications and changes to the process 400 may be made by those skilled in the art under the guidance of the present disclosure. However, these modifications and changes are still within the scope of the present disclosure. For example, in step 430, the execution of the predetermined operation is not limited to the contents of the description.

Figure 5:
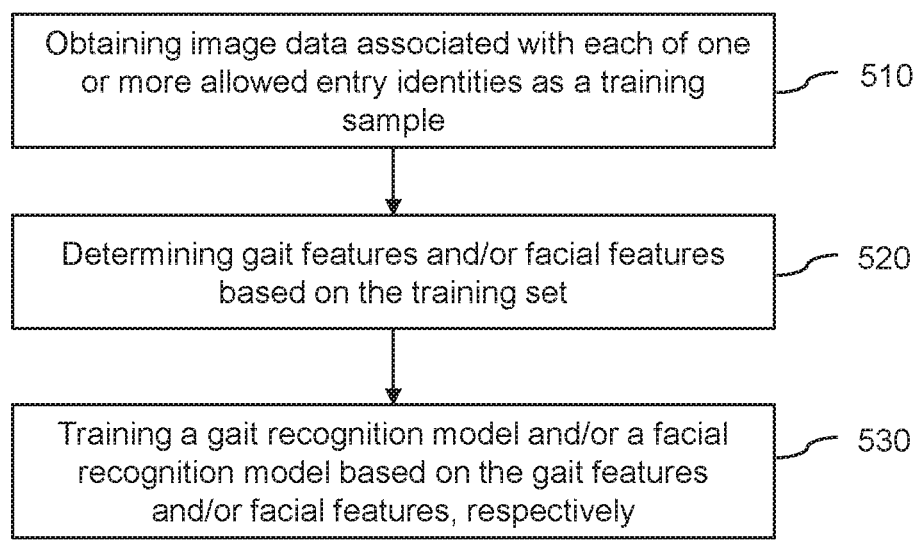
FIG. 5 is an exemplary flowchart illustrating a process for determining a gait recognition model and/or a face recognition model according to the embodiment of the present disclosure.

FIG. 5 is an exemplary flowchart illustrating a process 500 for determining a gait recognition model and/or a face recognition model according to the embodiment of the present disclosure. In some embodiments, process 500 may be performed by a processing logic, which may include hardware (e.g., a circuit, a dedicated logic, a programmable logic, microcode, or the like), software (instructions implemented on a processing device to perform hardware emulation), or the like, or any combination thereof. One or more operations in the process 500 shown in FIG. 5 may be implemented by the smart door system 100 shown in FIG. 1. For example, the process 500 may be stored in the storage device 130 in the form of instructions and called and/or executed by the processing engine 112.

In 510, the processing engine 112 may obtain image data associated with each of one or more allowed entry identities as a training set. In some embodiments, operation 510 may be performed by the training module 340. The image data associated with an allowed entry identity may include one or more videos, images, etc. An allowed entry identity may correspond to a person, a pet, etc., who may be allowed to enter a building. Each of the one or more allowed entry identities may correspond to a training set. The training set corresponding to a specific allowed entry identity may be marked with a label representing the specific allowed entry identity. The training set corresponding to an allowed entry identity may include a plurality of training samples. The plurality of training samples may include the image data acquired at different time and/or periods (e.g., childhood, youth, senectitude, etc.), different conditions (e.g., in case of injury, under load, etc.), different angles and/or views, etc.

In some embodiments, a training set corresponding to a specific allowed entry identity may include a plurality of videos associated with the specific allowed entry identity. The plurality of videos associated with the allowed entry identity may correspond to different parts of the body generated when the allowed entry identity walks at different time and/or periods (e.g., childhood, youth, senectitude, etc.), different conditions (e.g., in case of injury, under load, etc.), different angles and/or views, etc. As a further example, the plurality of videos of the allowed entry identity may include a walking video of a resident in a normal state, a walking video of a resident when the resident is carrying a bag, walking videos of a resident from the back, or the front, or a side of the resident, etc. The more the videos of an allowed entry identity, the more beneficial it is for model training. In some embodiments, the training module 340 may obtain the training set from the camera 160, the storage device 130, and/or the information source 150 via the network 140. In some embodiments, the training module 340 may update the training set to periodically and/or in real time.

In some embodiments, a training set corresponding to a specific allowed entry identity may include a plurality of facial images associated with the specific allowed entry identity. The facial images of an allowed entry identity may be captured at different time and/or periods (e.g., childhood, youth, senectitude, morning, afternoon, night, etc.), different states or conditions (e.g., in case of injury, under load, talking, etc.), different environments, different angles and/or views (e.g., an overlook view, an upward view, etc.), different expressions (e.g., anger, sadness, happiness, fear, etc.), etc. In some embodiments, the facial images of an allowed entry identity may include facial images of different parts of the face. For example, the facial images of an allowed entry identity may be captured from a resident's front and a side of the resident. As another example, the facial images of an allowed entry identity may be captured when a resident is speaking with a person and when the resident does not speak. As still example, the facial images of an allowed entry identity may be captured when the afternoon light is weak and when the light is strong, such as at noon. As still another example, the facial images of an allowed entry identity may be sharp images and a partially clear or blurred images being blocked by others. In some embodiments, the training module 340 may obtain the training samples from the camera 160, the storage device 130, and/or the information source 150 via the network 140. In some embodiments, the training module 340 may mark an image and/or a video with a recognition result that a subject presented in the image and/or video is an allowed entry identity with a label as a positive sample", and save the image and/or video with the label as the positive sample as a new training sample to periodically and/or in real time update the training samples e.g., weekly updates or monthly updates), and update the facial recognition model.

In 520, the processing engine 112 may determine gait features and/or facial features based on the training set. In some embodiments, operation 520 may be performed by the training module 340.

In some embodiments, the training module 340 may extract the gait features of an allowed entry identity from a training sample, such as a video associated with the allowed entry identity. For example, the training module 340 may determine the gait period associated with the allowed entry identity. The processing engine 112 may further determine a start frame and an end frame during the gait period. The processing engine 112 may obtain an image sequence from the video during the gait period. And then the processing engine 112 may determine the gait features from one or more image sequences. In some embodiments, the gait features may include swinging amplitude of a leg, a swinging frequency of a leg, a swinging phase of a leg, a swinging amplitude of the waist, a swinging frequency of the waist, a swinging phase of the waist, a linear velocity of a joint, an angular velocity of a joint, a stride size, a stride frequency, a target velocity, a target acceleration, or the like, or any combination thereof. In some embodiments, the training samples may be updated periodically or in real time to update the gait recognition model.

In some embodiments, the training module 340 may extract the facial features from a training sample, such as a facial image associated with the allowed entry identity. In some embodiments, the facial features may include an eye center point, a nose tip, a lip point, a face contour point, a nose contour point, a lip contour point, an eyebrow contour point, or the like, or any combination thereof.

In some embodiment, the training module 340 may determine a time information from a training sample, such as a facial image, a video associated with the allowed entry identity. The time information associated with a training sample may indicate the time when the training sample is generated.

In 530, the processing engine 112 may train a gait recognition model and/or a facial recognition model based on the gait features and/or facial features, respectively. In some embodiments, operation 530 may be performed by the training module 340. In some embodiments, the gait recognition model and/or a facial recognition model may be constructed based on a neural network model. Exemplary neural network models may include a convolutional neural network (CNN), a deep convolutional neural network (DCNN), a recurrent neural network (RNN), a back propagation (BP) neural network, a radial basis function (RBF) neural network, a perceptron neural network, a linear neural network, a self-organizing neural network, a feedback neural network, or the like, or a combination thereof.

In some embodiments, the training module 340 may train the gait recognition model based on the gait features corresponding to each of the one or more allowed entry identities to obtain a trained gait recognition model. In some embodiments, the trained gait recognition model may be used to determine whether a subject to be recognized in an image or video corresponds to one of the one or more allowed entry identities. In some embodiments, the trained gait recognition model may be used to identify an allowed entry identity from the one or more allowed entry identities that is closest to and/or matches with a subject to be recognized in an image or video. The trained gait recognition model may be configured to generate and/or output a first confidence level that the subject to be recognized matches the closest allowed entry identity. In some embodiments, the identification module 320 may input the gait features of the subject to be recognized in the image or video into the trained gait recognition model, and obtain the first confidence level of the subject to be recognized in the image or video matches the closest allowed entry identity based on the gait recognition model. In some embodiments, the processing engine 112 and/or the trained gait recognition model may be configured to compare the first confidence level with the first threshold to determine whether the subject correspond to the allowed entry identity.

In some embodiments, the training module 340 may train the facial recognition model based on the facial features corresponding to each of the one or more allowed entry identities to obtain a trained facial recognition model. In some embodiments, the trained facial recognition model may be used to determine whether a subject to be recognized in an image or video corresponds to one of the one or more allowed entry identities. In some embodiments, the trained facial recognition model may be used to identify an allowed entry identity from the one or more allowed entry identities that is closest to and/or matches with a subject to be recognized in an image or video. The trained facial recognition model may be configured to generate and/or output a second confidence level that the subject to be recognized matches the closest allowed entry identity. In some embodiments, the identification module 320 may input the facial features of the subject to be recognized in the image or video into the trained facial recognition model, and obtain the second confidence level of the subject to be recognized in the image or video matches the closest allowed entry identity based on the trained facial recognition model. In some embodiments, the processing engine 112 and/or the trained facial recognition model may be configured to compare the second confidence level with a second threshold to determine whether the subject is the allowed entry identity.

In some embodiments, the training module 340 may train a recognition model based on the facial features and the gait features corresponding to each of the one or more allowed entry identities to obtain a trained recognition model. The trained recognition model may be used to determine whether a subject to be recognized in an image or video corresponds to one of the one or more allowed entry identities. In some embodiments, the trained recognition model may be used to identify an allowed entry identity from the one or more allowed entry identities that is closest to and/or matches with a subject to be recognized in an image or video. The trained recognition model may be configured to generate and/or output a confidence level that the subject to be recognized matches the closest allowed entry identity. In some embodiments, the identification module 320 may input the facial features and the gait features of the subject to be recognized in the image or video into the trained recognition model, and obtain the confidence level of the subject to be recognized in the image or video matches the closest allowed entry identity based on the trained recognition model. In some embodiments, the processing engine 112 and/or the trained facial recognition model may be configured to compare the confidence level with a threshold to determine whether the subject is the allowed entry identity.

In some embodiments, the training module 340 may train a recognition model (e.g., the gait recognition model or the facial recognition model) using the facial features and/or the gait features and time information corresponding to each of the one or more allowed entry identities to obtain a trained recognition model.

The training set and/or identity recognition model (e.g., a gait recognition mode, a facial recognition model) may be updated from time to time, e.g., periodically or not, based on a sample set that is at least partially different from the original training set from which the original identity recognition model (e.g., a gait recognition mode, a facial recognition model) is determined. For instance, the identity recognition model may be updated based on a sample set including new samples that are not in the original training set, samples who are identified using the original identity recognition model, or the like, or a combination thereof.

In some embodiments, the determination and/or updating of the identity recognition model may be performed on a processing device, while the application of the identity recognition model may be performed on a different processing device. In some embodiments, the determination and/or updating of the identity recognition model may be performed on a processing device of a system different than the anomaly detection system 100 or a server different than the server 110 on which the application of the identity recognition model is performed. For instance, the determination and/or updating of the identity recognition model may be performed on a first system of a vendor who provides and/or maintains such a machine learning model and/or has access to training samples used to determine and/or update the identity recognition model, while identity recognition of a subject based on the provided identity recognition model may be performed on a second system of a client of the vendor. In some embodiments, the determination and/or updating of the identity recognition model may be performed online in response to a request for identity recognition. In some embodiments, the determination and/or updating of the identity recognition model may be performed offline.

It should be noted that the description of the process 500 is for illustrative purposes only and does not limit the scope of application of the present disclosure. Various modifications and changes to the process 500 may be made by those skilled in the art under the guidance of the present disclosure. However, these modifications and changes are still within the scope of the present disclosure. For example, the facial recognition model and the gait recognition model may be constructed based on the same as or different neural network model.

Figure 6:
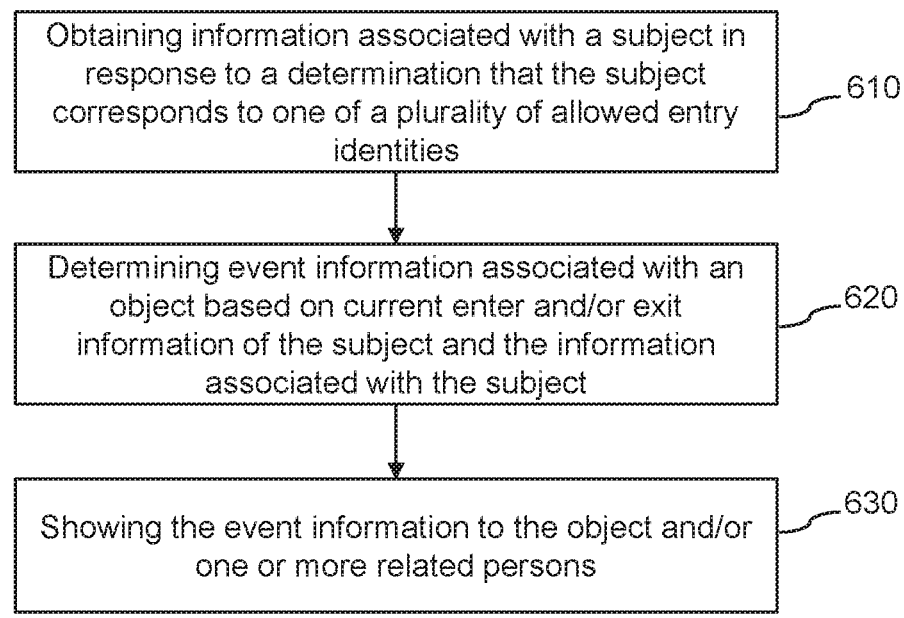
FIG. 6 is an exemplary flowchart illustrating a process for user assistant according to some embodiments of the present disclosure.

FIG. 6 is an exemplary flowchart illustrating a process 600 for user assistant according to some embodiments of the present disclosure. In some embodiments, process 600 may be performed by a processing logic, which may include hardware (e.g., a circuit, a dedicated logic, a programmable logic, microcode, or the like), software (instructions implemented on a processing device to perform hardware emulation), or the like, or any combination thereof. One or more operations in the process 600 shown in FIG. 6 may be implemented by the smart door system 100 shown in FIG. 1. For example, the process 600 may be stored in the storage device 130 in the form of instructions and called and/or executed by the processing engine 112.

In 610, the processing engine 112 may obtain information associated with a subject in response to a determination that the subject corresponds to one of one or more allowed entry identities. In some embodiments, operation 610 may be performed by the execution module 330 (e.g., the residence assistant unit 333). In some embodiments, the identification of the subject may be performed as described elsewhere in the present disclosure (e.g., FIG. 4 and the descriptions thereof). For example, when the subject approaches the door of the building or the housing estate. Video streams may be captured by the one or more cameras (e.g., IP cameras, a camera installed a mobile terminal of the subject) and be transmitted to the processing engine 112. The processing engine 112 may perform an identity recognition (e.g., face recognition or gait recognition, a voice recognition) based on the video streams. The processing engine 112 may determine whether the subject corresponds to one of the one or more allowed entry identities of the building or the housing estate. The processing engine 112 may further determine a specific allowed entry identity corresponding to the subject from the one or more allowed entry identities. For example, the processing engine 112 may determine that the subject is resident A of building B, floor C, unit D.

In some embodiments, the information of the subject may include information of one or more family members of the subject, schedule information of the subject, information of one or more related persons (e.g., friends, colleague, etc.) of the subject, or the like, or a combination thereof. For example, the information of a family member of the subject may include a contact of the family member, a message or warn left by the family member, a schedule of the family member (e.g., a travel plan, an appointment, a working plan, etc.), enter and/or exit records, etc. The schedule information of the subject may include information of a travel plan of the subject (e.g., time, site, etc.), information of an appointment of the subject (e.g., time, site, purpose, etc.), information of a working plan of the subject (e.g., meeting time, tasks, meeting participators, etc.), etc. The information of or more related persons (e.g., friends, colleague, etc.) of the subject may include a contact of the or more related persons (e.g., friends, colleague, etc.), a message or warn left by the one or more related persons (e.g., friends, colleague, etc.), a forward visiting time of the one or more related persons (e.g., friends, colleague, etc.), a preference (e.g., food) of the one or more related persons (e.g., friends, colleague, etc.), historical visiting records, etc.

In some embodiments, the execution module 230 may obtain the information of the subject from the terminal 120 (e.g., a mobile phone), the storage device 130, the information source 150 via the network 140. For example, the execution module 230 may obtain the information of one or more family members of resident A and the schedule information of resident A from a mobile phone of resident A. As another example, the execution module 330 may obtain one or more visitor records of resident A stored in the storage device 130 for a period of time. As a further example, the execution module 230 may obtain the information of one or more family members of resident A from the storage device 130. Specially, the processing engine 112 may identify a family member of resident A (e.g., wife of resident A) when the family member of resident A enters and/or exits a door of housing estate and record the time when the family member of resident A (e.g., wife of resident A) enters and/or goes out the door of the housing estate. The processing engine 112 may store the information for entering and/or exiting the housing estate of the family member of resident A in the storage device 130.

In 620, the processing engine 112 may determine event information associated with a subject based on current enter and/or exit information of the subject and the information associated with the subject. In some embodiments, operation 620 may be performed by the execution module 330 (e.g., the residence assistant unit 333 or data analysis unit 331). In some embodiments, the current enter and/or exit information of the subject may include time when the subject (e.g., a resident) enters a building or the housing estate, an entrance (i.e., a front door, a back door, or a garage door) of building or the housing estate from which the subject (e.g., the resident) enters, the time when the subject (e.g., the resident) leaves the building or the housing estate, an entrance (i.e., a front door, a back door, or a garage door) of the building or the housing estate from which the subject (e.g., the resident) exits, the video and/or image of the subject (e.g., the resident) entering or leaving the building or the housing estate, etc. In some embodiments, the execution module 330 may compile the current enter and/or exit information of the subject and the information associated with the subject to obtain compiled information. The compiled information may indicate various correlations among data collected at different times, data collected from different cameras, data related to different residents or subjects, data collected from different information sources, etc. The processing engine 112 may generate the event information associated with the subject based on the compiled information. The event information associated with the subject may include information associated with an event of the subject, an event of a family member of the subject, an event associated with a partner of the subject, or the like, or a combination thereof.

In some embodiments, the processing engine 112 may determine information of a family member of the subject, for example, time when the family member enters and/or exits the building or the housing estate when the processing engine 112 determines that the subject is entering the building or the housing estate. The execution module 330 may correlate the current enter and/or exit information of the subject (e.g., a husband) with the enter and/or exit information of a family member (e.g., a wife) of the subject. The execution module 330 may compare the time when the subject (e.g., a husband) enters and/or exits the building or the housing estate with the time when the family member (e.g., a wife) of the subject enters and/or exits the building or the housing estate. The execution module 330 may determine an event that the family member (e.g., a wife) of the subject has been or not entered and/or exited the building or the housing estate. As a further example, the event information of resident A may include that resident A enters the building at 18:00 on Jun. 1, 2019 and returned home after work. The event information of resident A may include that the resident A's daughter enters the building at 15:00 on Jun. 1, 2019 and went home from school. As another example, when resident A enters the building at 3 pm on Jun. 1, 2017, based on the compiled information, the processing engine 112 may determine that the resident A's daughter has a dance performance at the school at 4 pm and resident A's wife has entered the building prior to resident A. Therefore, the processing engine 112 may transmit a message to resident A's electronic device (e.g., a mobile phone) alerting that they need to attend their daughter's dance performance and his wife is home already. As still an example, when resident A exits the building at 8 a.m. on Jun. 1, 2017, based on the compiled information, the processing engine 112 may determine that the resident A has an appointment at a park at 5 p.m. Therefore, the processing engine 112 may transmit a message to resident A's electronic device (e.g., a mobile phone) alerting that he or she needs to arrives at the park before 5 p.m.

In some embodiments, the processing engine 112 may determine schedule information of the subject, for example, appointment time, when the processing engine 112 determines that the subject is exiting the building or the housing estate. In some embodiments, the processing engine 112 may correlate and/or compare the current enter and/or exit information of the subject with historical enter and/or exit information at different times of the subject. If the current enter and/or exit information of the subject is different or has a larger difference with the historical enter and/or exit information, the processing engine 112 may determine an event of the subject associated with the difference with the historical enter and/or exit information. For example, resident A usually walks the dog at 6:00 a.m. But the processing engine 112 may identify that resident A exits the housing estate at 6:30 a.m. The processing engine 112 may determine an event that resident A walks the dog later than usually and generate a reminder for next day to remind resident A to walk dog on time.

In 630, the processing engine 112 may show the event information to the subject and/or one or more related person. In some embodiments, operation 630 may be performed by the execution module 330. In some embodiments, the execution module 330 may send the event information to an electronic device (e.g., a mobile phone) of the subject, a family member, a friend, a partner, etc. In some embodiments, the execution module 330 may send the event information to a display device of a door of the building or the housing estate for display to the subject.

It should be noted that the description of the process 600 is for illustrative purposes only and does not limit the scope of application of the present disclosure. Various modifications and changes to the process 600 may be made by those skilled in the art under the guidance of the present disclosure. However, these modifications and changes are still within the scope of the present disclosure. For example, operation 610 and operation 620 may be combined to execution. As another example, operation 610 may be omitted. Operation 620 may further include obtaining information associated with the subject in response to that the subject is identified as an allowed entry identity.

Figure 7:
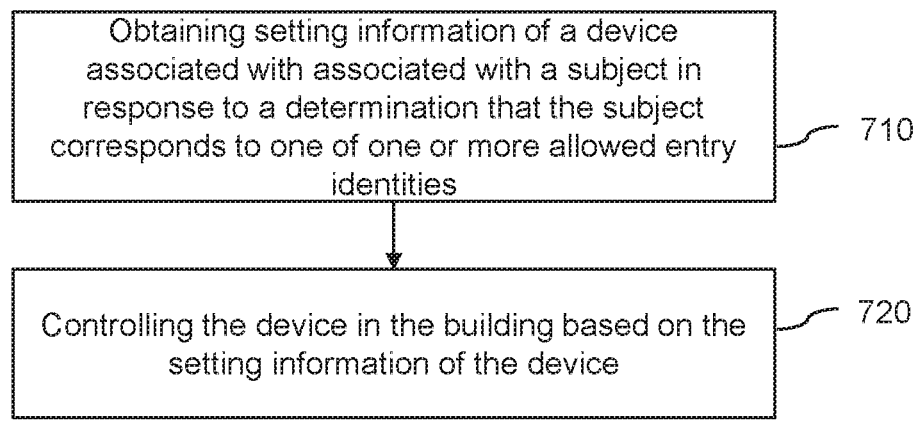
FIG. 7 is an exemplary flow diagram illustrating a process for home automation according to some embodiments of the present disclosure.

FIG. 7 is an exemplary flow diagram illustrating a process 700 for home automation according to some embodiments of the present disclosure. In some embodiments, process 700 may be performed by a processing logic, which may include hardware (e.g., a circuit, a dedicated logic, a programmable logic, microcode, or the like), software (instructions implemented on a processing device to perform hardware emulation), or the like, or any combination thereof. One or more operations in the process 700 shown in FIG. 7 may be implemented by the smart door system 100 shown in FIG. 1. For example, the process 700 may be stored in the storage device 130 in the form of instructions and called and/or executed by the processing engine 112.

In 710, the processing engine 112 may obtain setting information of a device associated with associated with a subject in response to a determination that the subject corresponds to one of one or more allowed entry identities. In some embodiments, operation 710 may be performed by the execution module 330 (e.g., the home automation unit 345). In some embodiments, the setting information of the device of the subject may include setting information of a mobile device of the subject, setting information of a home appliance of the subject, setting information of a door lock of the house of the subject, or the like. For example, the door lock of the house of resident A may be set to be unlocked in response to the subject to be recognized in image data is resident A. And the door lock may be automatically locked in 5 minutes after unlocking to prevent resident A forgetting to lock the door. As another example, the lighting system in the house of resident A may be set to automatically turn on after the door lock is unlocked and/or turn off after resident A is identified to exit the house. As still another example, the air conditioning system in the house of resident A may be set to automatically adjust the indoor temperature after the door lock is unlocked, for example, adjust the indoor temperature to 25 degrees. In some embodiments, the device of the subject may also include one or more a garage door lock, a vehicle, a home audio, a television, a refrigerator, a rice cooker, a washing machine, a sweeping robot, or the like. In some embodiments, the execution module 330 may obtain the setting information of the device associated with an allowed entry identity from the storage device 130, the terminal 120, and/or the information source 150 via the network 140.

In 720, the processing engine 112 may control the device in the building based on the setting information of the device. In some embodiments, operation 720 may be performed by the execution module 230. In some embodiments, the execution module 330 may control the electric equipment, such as an electric light, an air conditioner, a home audio, a television, a refrigerator, a rice cooker, a washing machine, a sweeping robot, etc., to start working after the door lock is unlocked according to the setting information. In some embodiments, the processing engine 112 may automatically turn on or off the home facilities upon detecting the subject (e.g., resident) entering the building by communicating with one or more smart sensors installed in the subject's (e.g., resident's) home. For example, the processing engine 112 may turn on the air conditioner of the subject's (e.g., resident's) home upon detecting that the subject (e.g., resident) enters the building in hot summer. As another example, the processing engine 112 may turn on the lights in the doorway of the subject's (e.g., resident's) home upon detecting that the resident returns in evening.

It should be noted that the description of the process 700 is for illustrative purposes only and does not limit the scope of application of the present disclosure. Various modifications and changes to the process 700 may be made by those skilled in the art under the guidance of the present disclosure. However, these modifications and changes are still within the scope of the present disclosure. For example, the device associated with the allowed entry identity is not limited to the listed electrical devices. As another example, operation 710 may be omitted. Operation 720 may further include obtaining setting information of a device associated with the subject in response to that the subject is identified as an allowed entry identity.

FIG. 8 is an exemplary flow chart illustrating a process 800 for content recommendation according to some embodiments of the present disclosure. In some embodiments, process 800 may be performed by a processing logic, which may include hardware (e.g., a circuit, a dedicated logic, a programmable logic, microcode, or the like), software (instructions implemented on a processing device to perform hardware emulation), or the like, or any combination thereof. One or more operations in the process 800 shown in FIG. 8 may be implemented by the smart door system 100 shown in FIG. 1. For example, the process 800 may be stored in the storage device 130 in the form of instructions and called and/or executed by the processing engine 112.

In 810, the processing engine 112 may obtain personalized information associated with a subject in response to a determination that the subject corresponds to one of one or more allowed entry identities. In some embodiments, operation 810 may be performed by the execution module 330 (e.g., the content recommending unit 344). In some embodiments, the identification of the subject may be performed as described elsewhere in the present disclosure (e.g., FIG. 4 and the descriptions thereof). For example, when the subject approaches the door of the building or the housing estate. Video streams may be captured by the one or more cameras (e.g., IP cameras, a camera installed a mobile terminal of the subject) and be transmitted to the processing engine 112. The processing engine 112 may perform an identity recognition (e.g., face recognition or gait recognition, a voice recognition) based on the video streams. The processing engine 112 may determine whether the subject corresponds to one of the one or more allowed entry identities of the building or the housing estate. The processing engine 112 may further determine a specific allowed entry identity corresponding to the subject from the one or more allowed entry identities. For example, the processing engine 112 may determine that the subject is resident A of building B, floor C, unit D.

In some embodiments, the personalized information associated with the subject may include schedule information, traffic condition information, weather information, clothing recommendations, restaurants near the building, property information, or the like, according to preference information of the allowed entry identity. In some embodiments, the execution module 330 may obtain the personalized information associated with each of the plurality of allowed entry identity via the network 140 from the terminal 120, the storage device 130, and/or or the information source 150. In some embodiments, the execution module 330 may communicate with one or more content providers via the network to obtain the information, for example, a GPS based navigation provider, a weather forecasting provider, a personal styling provider, a dinning content provider, etc.

In 820, the processing engine 112 may send the personalized information associated with the subject to an electronic device. In some embodiments, operation 820 may be performed by the execution module 330. In some embodiments, the execution module 330 may send the personalized information to the electronic device (e.g., a mobile phone) of the subject, a family member of the subject, a friend of the subject, a partner of the subject, etc. In some embodiments, the execution module 330 may send the personalized information to a display device of a door of the building or the housing estate for display to the subject. In some embodiments, the processing engine 112 may show the personalized information to the user via text, voice, image, video, etc. The personalized information may be different when the subject enters or exits the building or the housing estate. For example, If the processing engine 112 determines that the subject is exiting the building or the housing estate, the processing engine 112 may send the weather information to the mobile phone of the subject and generate a reminder based on the weather information. The reminder may include "It's rainy today, please bring an umbrella", "It's sunny today, sunscreen please", etc. If the processing engine 112 determines that the subject is entering the building or the housing estate, the processing engine 112 may send the property information to the mobile phone of the subject and generate a reminder based on the property information. The reminder may include "Please pay property fee before tomorrow", "Power outage notice", etc.

It should be noted that the description of the process 800 is for illustrative purposes only and does not limit the scope of application of the present disclosure. Various modifications and changes to the process 800 may be made by those skilled in the art under the guidance of the present disclosure. However, these modifications and changes are still within the scope of the present disclosure. For example, the personalized information is not limited to the listed type of information. As another example, operation 810 may be omitted. Operation 820 may further include obtaining the personalized information associated with the subject in response to that the subject is identified as an allowed entry identity.

The beneficial effects that the present disclosure embodiment may bring include, but are not limited to: (1) identity recognition by gait recognition, face recognition, and voice interaction, improving recognition accuracy; (2) Use the relevant information stored in the system to provide users with multiple services of event information push, home appliance control, personalized information push, or the like, increasing the intelligence of the system. It should be noted that different embodiments may have different beneficial effects. In different embodiments, the beneficial effects may be any combination of one or more of the above, or any other beneficial effects that may be obtained.

The basic concept has been described above, and it is obvious to those skilled in the art that the detailed disclosure is by way of example only and does not constitute a limitation of the present disclosure. Various modifications, improvements, and adaptations of the present disclosure may be made by those skilled in the art, although not explicitly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, certain features, structures, or features of one or more embodiments of the present disclosure may be combined as appropriate.

Moreover, those skilled in the art will appreciate that aspects of the present disclosure may be illustrated and described by a number of patentable categories or situations, including any new and useful processes, combinations of machines, products or materials, or any new and useful improvements to them. Accordingly, various aspects of the present disclosure may be performed entirely by hardware, may be performed entirely by software (including firmware, resident software, microcode, or the like), or may be performed by a combination of hardware and software. The above hardware or software may be referred to as "data block", "module", "engine", "unit", "component" or "system". In addition, aspects of the present disclosure may be embodied as a computer product located on one or more computer readable media, including a computer readable program code.

The computer storage medium may contain a propagated data signal containing a computer program code, such as on a baseband or as part of a carrier. The propagated signal may have a variety of manifestations, including electromagnetic forms, optical forms or the like, or a suitable combination. The computer storage medium may be any computer readable medium other than a computer readable storage medium that may communicate, propagate, or transport the program for use by connection to an instruction execution system, apparatus, or device. The program code located on the computer storage medium may be propagated through any suitable medium, including radio, cable, fiber optic cable, RF, or similar medium, or any combination of the medium.

Computer program code for carrying out operations for aspects of the present disclosure may be written in any combination of one or more programming languages, including a subject oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or the server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, it is intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or a mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. However, this disclosure method does not mean that the present disclosure subject requires more features than the features mentioned in the claims. Rather, claim subject matters lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending on the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each patent, patent application, patent application publication and other materials cited herein, such as articles, books, instructions, publications, documents, or the like, are hereby incorporated by reference in their entirety. Application history documents that are inconsistent or conflicting with the contents of the present application are excluded, and documents (currently or later attached to the present application) that limit the widest range of the scope of the present application are also excluded. It is to be noted that if the description, definition, and/or terminology used in the appended application of the present application is inconsistent or conflicting with the contents described in this application, the description, definition and/or terminology may be subject to the present application.

At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with the teachings herein. Accordingly, the embodiments of the present disclosure are not limited to the embodiments that are expressly introduced and described herein.

What is claimed is:

1. A method implemented on a computer for smart door operation via the computer, the method comprising:
   obtaining image data of one or more subjects, the image data being acquired by one or more cameras in communication with the computer;
   determining, based on the image data, one or more gait features of at least one of the one or more subjects;
   determining, based on the gait features of at least one of the one or more subjects, a gait recognition result indicating whether the at least one of the one or more subjects is consistent with one of one or more allowed entry identities;
   determining, based on facial features of at least one of the one or more subjects derived from the image data, a facial recognition result indicating whether the at least one of the one or more subjects is consistent with the one of one or more allowed entry identities;
   in response to determining that the facial recognition result is different from the gait recognition result, updating gait features or facial features of the one of one or more allowed entry identities based on the facial recognition result and the gait recognition result; and
   sending, based on identity information of the at least one of the one or more subjects, an unlocking signal to a lock, so that the lock is unlocked.

2. The method of claim 1, wherein the determining the gait recognition result includes:
   determining, based on the one or more gait features using a gait recognition model, a first confidence level that the identity information of the at least one of the one or more subjects corresponds to one of one or more allowed entry identities;
   determining the gait recognition by determining whether the first confidence level exceeds or equals a first threshold.

3. The method of claim 2, wherein the gait recognition model is determined via a process including:
   obtaining video data associated with the one or more allowed entry identities as the training samples;
   extracting gait features from each of the training samples; and
   training the gait recognition model based on the gait features of each of the training samples.

4. The method of claim 1, wherein the determining the facial recognition result includes:
   determining, based on the one or more facial features, a second confidence level that the identity information of the at least one of the one or more subjects corresponds to the one of the one or more allowed entry identities;
   determining the facial recognition result by determining whether the second confidence level exceeds or equals a second threshold.

5. The method of claim 4, wherein the determining, based on the one or more facial features, a second confidence level that the identity information is the one of the one or more allowed entry identities includes:
   obtaining a face recognition model; and
   determining the second confidence level based on the facial features of the at least one of the one or more subjects using the face recognition model.

6. The method of claim 5, wherein the face recognition model is determined via a process including:
   obtain facial images of the one or more allowed entry identities as training samples;
   extracting facial features from each of the training samples; and
   training the face recognition model based on the facial features of each of the training samples.

7. The method of claim 1, wherein the gait features include at least one of:
   a swinging amplitude of a leg, a swinging frequency of the leg, a swinging phase of the leg, a swinging amplitude of a waist, a swinging frequency of the waist, a swinging phase of the waist, a linear velocity of a joint, an angular velocity of the joint, a step size, a stride frequency, a target velocity, or a target acceleration.

8. The method of claim 1, wherein the facial features include at least one of:
   an eye center point, a nose tip, a lip corner point, a facial contour point, an eye contour point, a nose contour point, a lip contour point, or an eyebrow contour point.

9. The method of claim 1, wherein the method further includes:
   showing a message to the at least one of the one or more subjects based on the identity information of the at least one of the one or more subjects.

10. The method of claim 9, wherein the message includes a preset question, and the method further includes:
    verifying the identity information of the at least one of the one or more subjects based on a response of the at least one of the one or more subjects to the preset question.

11. The method of claim 1, wherein the method further includes:
    obtaining information associated with the one of the at least one of the one or more subjects;
    determining event information associated with the at least one of the one or more subjects based on current entry and exit information of the at least one of the one or more subjects and the information associated with the at least one of the one or more subjects; and
    showing the event information to the at least one of the one or more subjects.

12. The method of claim 1, wherein the method further includes:
    obtaining setting information of a device in a building associated with the at least one of the one or more subjects; and
    operating the device based on the setting information of the device.

13. The method of claim 1, wherein the method further includes:
    obtaining personalized information associated with the one of the one or more allowed entry identities; and
    showing the personalized information to the at least one of the one or more subjects.

14. The method of claim 1, wherein the method further includes:
    sending information associated with the at least one of the one or more subjects to a client terminal based on the identity information;
    generating a warning signal for the at least one of the one or more subjects based on the identity information;
    sending the information associated with the at least one of the one or more subjects to a client terminal associated with a specific contact based on the identity information;

reporting the police based on the identity information; or recording the information associated with the at least one of the one or more subjects.

15. A smart door apparatus, comprising at least one processor and at least one storage;

the at least one storage being configured to store an instruction; and the processor being configured to execute the instructions to implement a method for smart door operation, the method comprising:

obtaining image data of one or more subjects, the image data being acquired by one or more cameras in communication with the computer;

determining, based on the image data, one or more gait features of at least one of the one or more subjects;

determining, based on the gait features of at least one of the one or more subjects, a gait recognition result indicating whether the at least one of the one or more subjects is consistent with one of one or more allowed entry identities;

determining, based on facial features of at least one of the one or more subjects derived from the image data, a facial recognition result indicating whether the at least one of the one or more subjects is consistent with the one of one or more allowed entry identities;

in response to determining that the facial recognition result is different from the gait recognition result, updating gait features or facial features of the one of one or more allowed entry identities based on the facial recognition result and the gait recognition result; and sending, based on identity information of the at least one of the one or more subjects, an unlocking signal to a lock, so that the lock is unlocked.

16. The smart door apparatus of claim 15, wherein the determining the gait recognition result includes:

determining, based on the one or more gait features using a gait recognition model, a first confidence level that the identity information of the at least one of the one or more subjects corresponds to one of one or more allowed entry identities;

determining the gait recognition by determining whether the first confidence level exceeds or equals a first threshold.

17. The smart door apparatus of claim 16, wherein the determining the facial recognition result includes:

determining, based on the one or more facial features, a second confidence level that the identity information of the at least one of the one or more subjects corresponds to the one of the one or more allowed entry identities;

determining the facial recognition result by determining whether the second confidence level exceeds or equals a second threshold.

18. The smart door apparatus of claim 17, wherein the determining, based on the one or more facial features of the at least one of the one or, a second confidence level that the identity information is the one of the one or more allowed entry identities includes:

obtaining a face recognition model; and determining the second confidence level based on the facial features of the at least one of the one or more subjects using the face recognition model.

19. The smart door apparatus of claim 15, wherein the method further includes:

sending information associated with the at least one of the one or more subjects to a client terminal based on the identity information;

generating a warning signal for the at least one of the one or more subjects based on the identity information;

sending the information associated with the at least one of the one or more subjects to a client terminal associated with a specific contact based on the identity information;

reporting the police based on the identity information; or recording the information associated with the at least one of the one or more subjects.

20. A non-transitory computer readable medium storing instructions, the instructions, when executed by at least one processor, causing the at least one processor to implement a method comprising:

obtaining image data of one or more subjects, the image data being acquired by one or more cameras in communication with the computer;

determining, based on the image data, one or more gait features of at least one of the one or more subjects;

determining, based on the gait features of at least one of the one or more subjects, a gait recognition result indicating whether the at least one of the one or more subjects is consistent with one of one or more allowed entry identities;

determining, based on facial features of at least one of the one or more subjects derived from the image data, a facial recognition result indicating whether the at least one of the one or more subjects is consistent with the one of one or more allowed entry identities;

in response to determining that the facial recognition result is different from the gait recognition result, updating gait features or facial features of the one of one or more allowed entry identities based on the facial recognition result and the gait recognition result; and sending, based on identity information of the at least one of the one or more subjects, an unlocking signal to a lock, so that the lock is unlocked.

* * * * *